(12) United States Patent
Englbrecht et al.

(10) Patent No.: US 10,259,415 B2
(45) Date of Patent: Apr. 16, 2019

(54) SUBASSEMBLY OF A VEHICLE SAFETY SYSTEM, VEHICLE SAFETY SYSTEM, VEHICLE SAFETY DEVICE AND METHOD OF MANUFACTURING A SUBASSEMBLY OF A VEHICLE SAFETY SYSTEM

(71) Applicant: TRW AIRBAG SYSTEMS GMBH, Aschau am Inn (DE)

(72) Inventors: Karl Englbrecht, Erharting (DE); Vadim Kolbin, Haar (DE); Michael Gabler, Munich (DE); Georg Tautschnig, Muhldorf (DE)

(73) Assignee: TRW AIRBAG SYSTEMS GmbH, Aschau am Inn (DE)

( * ) Notice: Subject to any disclaimer, the term of this patent is extended or adjusted under 35 U.S.C. 154(b) by 0 days.

(21) Appl. No.: 15/154,049

(22) Filed: May 13, 2016

(65) Prior Publication Data
US 2016/0355216 A1    Dec. 8, 2016

(30) Foreign Application Priority Data

Jun. 3, 2015  (DE) .......................... 10 2015 006 898

(51) Int. Cl.
*B60R 21/01*  (2006.01)
*B60R 21/217*  (2011.01)
(Continued)

(52) U.S. Cl.
CPC ............ *B60R 21/01* (2013.01); *B60R 21/217* (2013.01); *B60R 21/2171* (2013.01); *B05D 1/02* (2013.01); *B60R 2021/003* (2013.01)

(58) Field of Classification Search
CPC . B60R 21/2177; B60R 21/26; B60R 21/2171; B60R 21/217;
(Continued)

(56) References Cited

U.S. PATENT DOCUMENTS 4,827,100 A * 5/1989 Frings .................... B23K 26/24
219/121.64
5,002,809 A * 3/1991 Nakahama ............... B05D 7/16
427/407.1
(Continued)

FOREIGN PATENT DOCUMENTS

DE   19631006   2/1998
DE   20021673   5/2001
(Continued)

*Primary Examiner* — Paul N Dickson
*Assistant Examiner* — Timothy Wilhelm
(74) *Attorney, Agent, or Firm* — Tarolli, Sundheim, Covell & Tummino L.L.P.

(57) ABSTRACT

The invention relates to a subassembly (10) of a vehicle safety system comprising a tubular casing (20) and comprising a fastening element (30) that includes at least one fastening hole (13) and a peripheral portion (31) curved at least in portions, wherein the peripheral portion (31) is connected at least at one connecting point (11) to the tubular casing (20). In accordance with the invention, the peripheral portion (31) includes at least one breakthrough (40) and a coating passage (17) is formed at least in portions between the peripheral portion (31) and the casing (20), wherein the tubular casing (20) includes at least in portions, especially on its entire exposed surface (21), an anti-corrosion layer and/or the fastening element (30) includes at least in portions, especially on its entire exposed surface (32), an anti-corrosion layer.

26 Claims, 6 Drawing Sheets

(51) Int. Cl.
  *B60R 21/00* (2006.01)
  *B05D 1/02* (2006.01)
(58) Field of Classification Search
  CPC ........... B60R 2021/26082; B60R 2021/26076; B60R 21/01; B60R 2021/003; B05D 1/02
  See application file for complete search history.

(56) References Cited

U.S. PATENT DOCUMENTS

| | | | | |
|---|---|---|---|---|
| 5,118,133 A * | 6/1992 | Zushi | B60R 21/217 | 280/728.2 |
| 5,257,815 A * | 11/1993 | Bachelder | B60R 21/2171 | 280/728.2 |
| 5,340,147 A * | 8/1994 | Fontecchio | B60R 21/201 | 280/728.2 |
| 5,732,971 A * | 3/1998 | Lutz | B60R 21/2171 | 280/728.2 |
| 6,241,278 B1 * | 6/2001 | Roote | B60R 21/213 | 280/728.2 |
| 6,361,064 B1 * | 3/2002 | Hopf | B60R 21/2171 | 280/728.1 |
| 6,419,266 B1 * | 7/2002 | Morfouace | B60R 21/26 | 280/740 |
| 6,435,541 B1 * | 8/2002 | Thomas | B60R 21/2171 | 280/728.2 |
| 6,559,416 B1 * | 5/2003 | Steenis | B23K 9/123 | 219/137.61 |
| 6,572,271 B2 * | 6/2003 | Bade | F16C 27/066 | 384/536 |
| 6,793,241 B2 * | 9/2004 | Wallner | B60R 21/213 | 24/455 |
| 6,837,513 B2 * | 1/2005 | Oka | B60R 21/2176 | 280/728.2 |
| 6,945,554 B2 * | 9/2005 | Henderson | B60R 21/26 | 280/728.2 |
| 7,097,196 B2 * | 8/2006 | Chavez | B60R 21/2171 | 280/728.2 |
| 7,175,196 B2 * | 2/2007 | Boxey | B60R 21/2171 | 280/730.2 |
| 7,308,758 B2 * | 12/2007 | Sausner | H01R 4/183 | 29/825 |
| 7,364,191 B2 * | 4/2008 | Siegel | B60R 21/26 | 280/730.2 |
| 7,364,194 B2 * | 4/2008 | Mabuchi | B60R 21/207 | 280/741 |
| 7,384,062 B2 * | 6/2008 | Yokoyama | B60R 21/23138 | 280/730.2 |
| 7,419,183 B2 * | 9/2008 | Tokuda | B60R 21/272 | 280/737 |
| 7,467,807 B2 * | 12/2008 | Hayashi | B60R 21/26 | 280/728.2 |
| 7,514,153 B1 * | 4/2009 | Archer, Jr. | C23C 28/00 | 428/623 |
| 7,631,908 B2 * | 12/2009 | Meier | B60R 21/2171 | 24/20 CW |
| 7,661,697 B2 * | 2/2010 | Itoga | B60R 21/18 | 280/728.2 |
| 7,661,704 B2 * | 2/2010 | Chen | B60R 21/213 | 280/728.2 |
| 7,731,261 B2 * | 6/2010 | Wenzel | B29C 45/006 | 180/90 |
| 7,735,853 B2 * | 6/2010 | Fink | B60R 21/213 | 280/728.2 |
| 7,862,075 B2 * | 1/2011 | Minamikawa | B60R 21/213 | 280/728.2 |
| 7,862,078 B2 * | 1/2011 | Yokota | B60R 21/2171 | 280/728.2 |
| 8,007,000 B2 * | 8/2011 | Gammill | B60R 21/232 | 280/730.2 |
| 8,141,897 B2 * | 3/2012 | Jang | B60R 21/213 | 280/728.2 |
| 8,191,927 B2 * | 6/2012 | Jordan | B60R 21/2644 | 280/736 |
| 8,434,782 B2 * | 5/2013 | Asano | B60R 21/213 | 280/728.2 |
| 8,556,290 B2 * | 10/2013 | Fischer | B60R 21/213 | 280/728.2 |
| 8,573,637 B2 * | 11/2013 | Fink | B60R 21/232 | 280/730.2 |
| 8,651,519 B2 * | 2/2014 | Czach | B60R 21/18 | 280/733 |
| 8,684,399 B2 * | 4/2014 | Honda | B60R 21/2171 | 280/728.2 |
| 8,820,779 B1 * | 9/2014 | Low | B60R 21/232 | 280/728.2 |
| 9,033,363 B2 * | 5/2015 | Witt, Jr. | B60R 21/261 | 280/728.2 |
| 9,333,935 B2 * | 5/2016 | Kim | B60R 21/213 | |
| 9,376,082 B2 * | 6/2016 | Osterfeld | B60R 21/2176 | |
| 9,493,137 B2 * | 11/2016 | Andersson | B60R 21/268 | |
| 9,511,737 B2 * | 12/2016 | Cho | B60R 21/213 | |
| 9,573,550 B1 * | 2/2017 | Mitchell | B60R 21/213 | |
| 9,580,036 B2 * | 2/2017 | Choi | B60R 21/213 | |
| 2005/0046154 A1 * | 3/2005 | Rhea | B60R 21/213 | 280/728.2 |
| 2006/0186644 A1 * | 8/2006 | Manire | B60R 21/2171 | 280/728.2 |
| 2006/0267315 A1 * | 11/2006 | White, Jr. | B60R 21/213 | 280/730.2 |
| 2007/0182131 A1 * | 8/2007 | Helbig | B60R 21/2165 | 280/728.2 |
| 2008/0088118 A1 * | 4/2008 | Wipasuramonton | B60R 21/23138 | 280/728.2 |
| 2009/0184494 A1 * | 7/2009 | Dominissini | B60R 21/217 | 280/728.2 |
| 2010/0181746 A1 * | 7/2010 | Rose | B60R 21/2171 | 280/736 |
| 2011/0221174 A1 * | 9/2011 | Cox | B60R 21/264 | 280/741 |
| 2014/0127423 A1 * | 5/2014 | Springer | F16C 3/023 | 427/541 |
| 2015/0284035 A1 * | 10/2015 | Reese | B62D 29/043 | 296/193.02 |

FOREIGN PATENT DOCUMENTS

| | | |
|---|---|---|
| DE | 102009012364 | 9/2010 |
| EP | 2078645 | 7/2009 |
| WO | 2012147654 | 11/2012 |

* cited by examiner

SUBASSEMBLY OF A VEHICLE SAFETY SYSTEM, VEHICLE SAFETY SYSTEM, VEHICLE SAFETY DEVICE AND METHOD OF MANUFACTURING A SUBASSEMBLY OF A VEHICLE SAFETY SYSTEM

RELATED APPLICATION

This application claims priority from German Patent Application No. 10 2015 006 898.9, filed Jun. 3, 2015, the subject matter of which is incorporated herein by reference.

BACKGROUND OF THE INVENTION

The invention relates to a subassembly of a vehicle safety system comprising a tubular casing and comprising a fastening element that includes a peripheral portion bent at least in portions, wherein the peripheral portion is connected to a tubular casing at least at one connecting point, according to claim 1. Furthermore, the invention relates to a vehicle safety system, especially a hood stay or an inflator for an airbag module. Moreover, the invention relates to a vehicle safety device for protecting a pedestrian and a vehicle safety device for protecting a vehicle occupant. The invention further relates to a method of manufacturing a subassembly of a vehicle safety system comprising a tubular casing and comprising a fastening element.

In DE 10 2009 012 364 A1 a subassembly comprising an inflator is disclosed. Depending on the mounting situation of said subassembly, the cylindrical outer wall as well as the thin-walled intermediate element associated with the subassembly and fastened by means of at least one welded connection may be directly exposed to environmental influences such as saline air and/or humidity. These environmental influences in individual cases might affect the elements of the subassembly, especially the connecting points of the subassembly elements, due to the occurrence of corrosion.

SUMMARY OF THE INVENTION

It is the object of the present invention to state a developed subassembly of a vehicle safety system, wherein the subassembly may be exposed to various environmental influences without any detrimental impact on the individual subassembly elements or on the connections between individual subassembly elements. It is a further object of the invention to state a vehicle safety system, a vehicle safety device as well as a method of manufacturing a subassembly of a vehicle safety system.

In accordance with the invention, this object is achieved with respect to the subassembly by the subject matter of claim 1, with respect to the vehicle safety system by the subject matter of claim 10, with respect to the vehicle safety device by the subject matter of claim 11 and with respect to the method of manufacturing a subassembly of a vehicle safety system by the subject matter of claim 12.

The invention is based on the idea to state a subassembly of a vehicle safety system comprising a tubular casing and a fastening element, the fastening element comprising at least one fastening hole and a peripheral portion curved at least in portions, wherein the peripheral portion is connected to the tubular casing at least at one connecting point.

According to the invention, the peripheral portion includes at least one breakthrough and between the peripheral portion and the casing at least in portions a coating passage is formed, wherein the tubular casing includes an anti-corrosion layer at least in portions, especially on its entire exposed surface, and/or the fastening element includes an anti-corrosion layer at least in portions, especially on its entire exposed surface. Due to such anti-corrosion layer the subassembly of a vehicle safety system can be variably installed in a vehicle. When placing the subassembly, care need not be taken any longer that said subassembly is exposed only to limited or particular environmental influences. Due to the anti-corrosion layer the individual elements or components of the subassembly are no longer affected by reason of environmental impacts. In this way also the connection or the at least one connecting point of the subassembly can be protected. As the peripheral portion includes at least one breakthrough and as between the peripheral portion and the casing at least in portions a coating passage is formed, it is possible that the corrosion layer is applied to especially critical areas, for example in the vicinity of the at least one connecting point. The at least one breakthrough enables a preferably large-area accessibility of the surfaces to be coated with an anti-corrosion layer and moreover contributes to weight saving for the fastening element. The coating passage enables also areas of the casing and of the fastening element which mutually cover each other and hence have no outwardly directly accessible areas in a projection perpendicular to the longitudinal direction of the casing to be optimally covered with an anti-corrosion layer.

The tubular casing preferably has an anti-corrosion layer on its entire exposed surface. The exposed surface is meant to be the surface which is not covered or, resp., on which no component is provided.

In addition or as an alternative, the fastening element includes an anti-corrosion layer at least in portions, especially on its entire exposed surface. The exposed surface of the fastening element is meant to be the surface which is not covered by another element and, resp., which is not in direct contact with any further component.

In a preferred embodiment of the invention, also the at least one connecting point has an anti-corrosion layer on all its areas accessible from outside. In other words, the subassembly of a vehicle safety system has to be completely provided with an anti-corrosion layer.

It is especially advantageous to design at least the at least one connecting point of the peripheral portion to have the tubular casing including an anti-corrosion layer. At least in the area of these connecting points, i.e. at least the connecting point and the adjacent surface areas of the peripheral portions and/or of the tubular casing preferably have to be formed with an anti-corrosion layer so that any detrimental impact of the material in this area or, resp., of the connecting point by environmental influences is avoided.

In another embodiment of the invention the peripheral portion of the fastening element is curved in the radial circumferential direction of the casing so that the peripheral portion at least in portions surrounds the inflator casing at a distance so as to form the coating passage. Consequently, the peripheral portion is curved so that between the peripheral portion of the fastening element and the tubular casing a distance is formed. Preferably the peripheral portion and the tubular casing are in contact merely at the at least one connecting point. This results in the fact that the tubular casing and/or the fastening element can be provided with an anti-corrosion layer even after connecting the two components. Especially with galvanic coating the areas around the connecting point and, resp., the areas in constructional vicinity to the at least one connecting point can be provided with an anti-corrosion layer.

The at least one connecting point may be a weld spot or a weld seam. In a preferred embodiment of the invention the fastening element, especially the peripheral portion of the fastening element, is fastened to the tubular casing by means of four weld spots. It is also possible to form plural weld seams for fastening the peripheral portion to the tubular casing. The advantage of spot welding consists in the fact that the connecting point can be formed to be relatively small so that the tubular casing and/or the fastening element have a great share in an exposed surface which can be provided with an anti-corrosion layer.

The peripheral portion of the fastening element includes an inner surface facing the tubular casing and an outer surface facing away from the tubular casing, wherein the at least one breakthrough is formed from the outer surface to the inner surface in the peripheral portion and especially the at least one breakthrough is not formed as a fastening hole for fastening the subassembly to a component fixed to the vehicle. The breakthrough can also be referred to as recess and/or hole and causes for example fluids and/or pasty mixtures as anti-corrosive to flow from the outside of the peripheral portion to the inside of the peripheral portion so that also in the area of the peripheral portion a fluid and/or a pasty mixture can be applied to the housing. Forming a breakthrough in the peripheral portion facilitates the application of an anti-corrosion layer to the tubular housing and to the inner surface of the peripheral portion. As the at least one breakthrough need not be designed as a fastening hole for fastening the subassembly to a component fixed to the vehicle, shapes of a breakthrough which are complex and/or relatively large regarding their cross-sectional surfaces can be realized. In this way the at least one breakthrough can be formed, on the one hand, in terms of optimum coating with an anti-corrosive layer and, on the other hand, the shape of standardized fastening elements, such as screws, which would strongly limit the shape of a breakthrough for the function as fastening hole need not be considered.

The thickness of the coating passage extending in the longitudinal direction of the casing, measured as a distance between the inner surface of the peripheral portion and a surface portion of the housing facing the peripheral portion, amounts to 0.5-2.0 mm, especially 0.6-1.5 mm, especially 0.7-1.0 mm, especially 0.8 mm. By virtue of designing a coating passage to have a distance between the inner surface of the peripheral portion and the surface portion of the casing facing the peripheral portion, especially the connecting area, especially the at least one connecting point of the peripheral portion with the tubular casing may be coated, especially electro-plated or spray-coated.

The at least one breakthrough formed in the peripheral portion includes a cross-sectional surface amounting to at least 30%, especially at least 40%, especially at least 50%, especially at least 60%, especially at least 70%, especially at least 80% of the surface of the peripheral portion. The confining cross-sectional surface is understood to be the surface describing the two-dimensional shape of the breakthrough in a top view. The larger the cross-sectional surface is formed relative to the surface of the peripheral portion, the more coating material can pass through the breakthrough to the inner surface of the peripheral portion and/or to the surface portion of the casing facing the peripheral portion. The application of an anti-corrosion layer is facilitated corresponding to an increasing cross-sectional surface of the breakthrough relative to the surface of the peripheral portion.

It is possible that plural, especially at least four, especially at least six, especially at least eight, especially at least ten breakthroughs are configured in the form of, especially circular, holes. The peripheral portion thus may include a hole matrix, wherein the individual breakthroughs in total describe a cross-sectional surface having such size relative to the surface of the peripheral portion which amounts to at least 30%, especially at least 40%, especially at least 50%, especially at least 60%, especially at least 70%, especially at least 80% of the surface of the peripheral portion.

In another embodiment of the invention it is possible that plural, especially four, breakthroughs are formed, each exhibiting a cross-sectional surface substantially in the form of an especially isosceles triangle, the breakthroughs being arranged on the peripheral portion so that the points of the triangular cross-sectional surfaces are facing each other and lands are formed between the breakthroughs. The point of an isosceles triangle is to be designated the spot of the triangle at which the two equal legs converge. Said points of the isosceles triangles and, resp., the points of triangles are arranged so that they are facing each other, i.e. that the points coincide in a common spot on the peripheral portion. Due to manufacture, said points may have a radius. In other words, the corners of the triangles may take the form of a rounding.

Lands are formed between the breakthroughs, i.e. between the breakthroughs having a triangular cross-sectional surface. If four breakthroughs are formed, at least four land portions are formed. By virtue of lands formed between the breakthroughs, the fastening element, especially the peripheral portion of the fastening element may be connected especially advantageously, in particular welded, to the tubular casing. The lands bring about a reduction of the stiffness in the area of the at least one connecting point, especially in the area of the at least one weld spot and/or the weld seam. The fastening element may be deformed more easily during connecting, especially during welding. The residual stresses in the connecting points, especially in the weld spots, are also reduced after the welding operation.

In another embodiment of the invention it is imaginable that plural, especially three, breakthroughs are formed each of which substantially includes a rectangular cross-sectional surface, wherein the lengths of the rectangular cross-sectional surfaces point in the radial circumferential direction of the casing or in the longitudinal direction of the casing. Lengths of the rectangular cross-sectional surfaces are meant to be the sides of the cross-sectional surfaces having the largest length. The lengths of all rectangular cross-sectional surfaces may point either in the radial circumferential direction of the casing or in the longitudinal direction of the casing. The radial circumferential direction of the casing is meant to be the direction of curvature of the tubular casing. The longitudinal direction of the casing defines the longitudinal extension of the elongate tubular casing.

In another embodiment of the invention four breakthroughs may be formed, wherein each of two first breakthroughs thereof has a cross-sectional surface substantially in the form of a pentagon and each of two second breakthroughs has a cross-sectional surface substantially in the form of a rectangle. The two first breakthroughs, i.e. the breakthroughs having a pentagonal cross-sectional surface, as well as the two second breakthroughs, i.e. the breakthroughs having a rectangular cross-sectional surface, are designed to face each other. Even in this embodiment at least four land portions are formed between the four breakthroughs so that the residual stress within the at least one connecting point is reduced after connecting, especially after welding.

The fastening element moreover may comprise at least one fastening flange, wherein an especially curved transitional portion is formed between the fastening flange and the peripheral portion. The transitional portion thus forms the connection between the fastening flange and the peripheral flange. The fastening flange preferably projects perpendicularly and/or tangentially from the surface of the tubular casing, wherein the fastening flange is not in direct contact with the surface of the tubular casing. Consequently, the fastening flange is in the form of a straight steel sheet piece, whereas the transitional portion forms the connection, preferably in curved shape, between the straight fastening flange and the at least partly curved peripheral portion.

The at least one fastening flange includes at least one fastening hole and/or at least one fastening slot. A screw and/or a rivet and/or similar fastening means may be inserted through said hole or, resp., slot so that the fastening flange can be fastened to a vehicle body.

In the transitional portion furthermore at least one bead may be formed. In this context, a bead causes an increase in stiffness of the fastening element in the transitional portion. The transitional portion connected to the casing is thus retained by means of the stiffened transitional portion on the fastening flange with the latter being tightly connected to the vehicle body.

In another embodiment of the invention, at least two fastening flanges are formed whose planes of extension extend substantially in parallel to each other. The fastening flanges are configured to be substantially linear, i.e. as a flat steel sheet piece. The planes of extension of the two fastening flanges and, resp., of the flat steel sheet pieces extend preferably in parallel to each other. It is possible that one of the fastening flanges merely has one fastening hole or one fastening slot, whereas the other fastening flange includes both a fastening hole and a fastening slot. Of preference, one fastening flange is designed to be larger than the other fastening flange. The larger fastening flange preferably includes a fastening hole and a fastening slot.

Such configuration regarding the fastening flanges permits especially tight mounting of the subassembly inside a vehicle body.

Within the scope of the present application, moreover a vehicle safety system, especially a hood stay or an inflator for an airbag module, is described, wherein according to the invention the vehicle safety system comprises an afore-described subassembly according to the invention. The vehicle safety system in accordance with the invention may be mounted variably inside a vehicle body due to a provided anti-corrosion layer so that no more attention has to be paid to the fact that the vehicle safety system in the mounted state is exposed to limited or particular environmental impacts only. This enables vehicle safety systems to be mounted in constructively optimal sections of the vehicle body.

Another aspect of the invention relates to a vehicle safety device for protection of a pedestrian comprising an afore-described vehicle safety system and/or comprising an afore-described subassembly according to the invention. The vehicle safety device further comprises an electronic control unit by means of which the vehicle safety system and/or the subassembly can be activated when a release situation is provided. In other words, the electronic control unit causes the hood stay to be activated upon occurrence of a release situation, i.e. upon collision with a pedestrian.

Another aspect of the invention relates to a vehicle safety device for protection of a vehicle occupant by an afore-described vehicle safety system and/or by an afore-described subassembly according to the invention. Moreover, the vehicle safety device comprises an electronic control unit by means of which the vehicle safety system and/or the subassembly can be activated when a release situation is provided. In other words, the electronic control unit causes the inflator for an airbag module to be activated in the case of accident or collision of the vehicle with other vehicles and/or further crash situations so that the airbag of an airbag module can be inflated. Such vehicle safety device and/or such vehicle safety system exhibit the advantages already illustrated in detail before, especially with respect to corrosion resistance.

Finally the present invention relates to a method of manufacturing a subassembly of a vehicle safety system comprising a tubular casing and comprising a fastening element that includes at least one fastening hole and one peripheral portion curved at least in portions. In particular, the method according to the invention relates to a method of manufacturing a subassembly according to the invention. The method according to the invention comprises the steps of:

- forming at least one breakthrough in the peripheral portion of the fastening element,
- connecting the peripheral portion at least at one connecting point to the tubular casing so that between the peripheral portion and the tubular casing a coating passage is formed at least in portions,
- coating at least in portions, especially completely coating the exposed surface, the tubular casing and/or the fastening element with an anti-corrosion layer.

It becomes clear that the coating operation and, resp., the application of an anti-corrosion layer onto the surface of the tubular casing and/or onto the surface of the fastening element is performed after connecting the peripheral portion to the casing.

The peripheral portion of the fastening element is welded and/or adhesively bonded to the tubular casing at least at one connecting point. In other words, the connecting point is a bonding spot or a welding spot. Concerning welding the peripheral portion to the tubular casing it is possible that the peripheral portion is fastened to the tubular casing by means of spot welding or seam welding. Preferably the peripheral portion is fastened to the casing by four spot welds.

The anti-corrosion layer of the tubular casing and/or the fastening element is applied by galvanic coating and/or spray-coating and/or painting. The application of the anti-corrosion layer and, resp., the coating operation are facilitated by the fact that the peripheral portion includes at least one breakthrough from the outer surface to the inner surface of the peripheral portion. The material of the anti-corrosion layer can reach all locations to be coated of the fastening element and/or of the tubular casing and/or of the connecting points.

BRIEF DESCRIPTION OF THE DRAWINGS

Hereinafter the invention shall be illustrated in detail by way of exemplary embodiments with reference to the enclosed schematic drawings, in which.

DESCRIPTION

Figure 1:
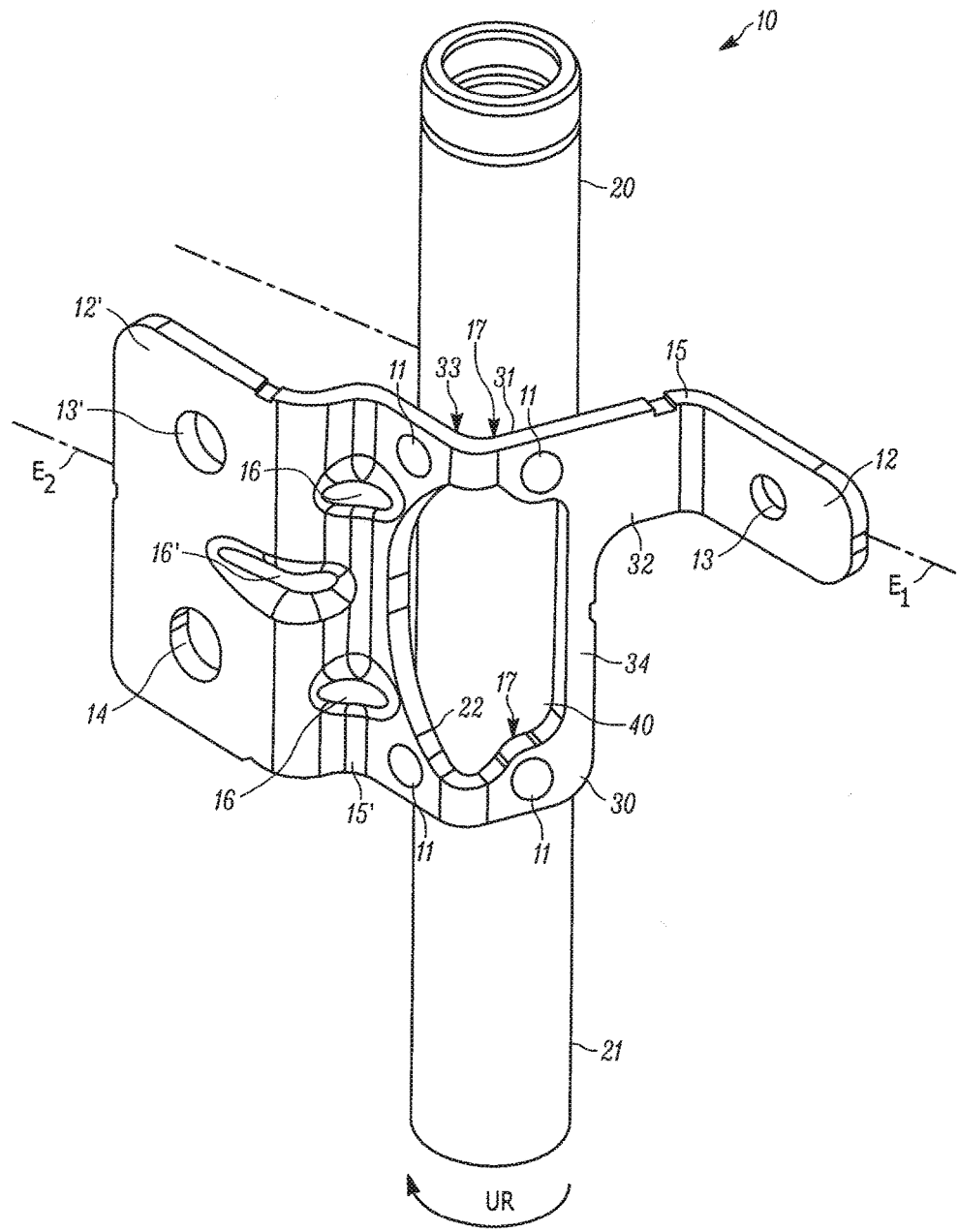
FIGS. 1 to 6 show various embodiments of the subassembly of a vehicle safety system according to the invention.

In the following identical reference numerals will be used for equal and equally acting parts.

FIG. 1 illustrates a subassembly 10 of a vehicle safety system comprising a tubular casing 20 and comprising a fastening element 30 that includes a fastening hole 13 and a peripheral portion 31 curved at least in portions. The peripheral portion 31 is connected to the tubular casing 20 at four connecting points 11. The connecting points 11 are weld spots.

In the shown subassembly 10 both the casing 20 is coated on its entire exposed surface 21 and the fastening element 30 is coated on its entire exposed surface 32 with an anti-corrosion layer, wherein for reasons of clarity the anti-corrosion layer itself is not shown in any Figure. Exposed surfaces 32 and 21 are meant to be the surfaces which are not in contact with a further component. The fastening element 30, especially the peripheral portion 31 is connected to the tubular casing 20 by means of the connecting points 11 so that between the inner surface 11 of the peripheral portion 31 and the surface portion 22 of the casing 20 facing the peripheral portion 31 a distance is formed causing a coating passage 17 to be formed. The distance between the inner surface 33 and the surface portion 22 amounts to 0.5-2.0 mm. Merely in the area of the connecting points 11 which are weld spots the peripheral portion 31 and the casing 20 are in contact with each other. The remaining portions of the inner surface 33 and the surface portion 22 are not in contact with each other. In all areas in which said portions of the inner surface 33 of the fastening element 30 and of the casing 20 that are not in contact with each other are opposed to each other or are facing each other, the coating passage 17 is formed. Hence the coating passage 17 cannot only be a relatively narrow passage but also a large-area volume structure resulting from the full-surface extension of the opposed portions of the inner surface 33 of the fastening element 30 and of the housing 20.

The connecting points 11 are equally provided with an anti-corrosion layer. Especially the connecting points 11 and the adjacent portions of the inner surface 33 and of the outer surface 34 of the peripheral portion as well as of the surface portion 22 of the casing 20 exhibit an anti-corrosion layer. Due to the anti-corrosion layer applied to said locations, the connecting points 11 are also protected from environmental impacts so that the connecting points cannot corrode or rust.

The peripheral portion 31 is curved in the radial circumferential direction UR of the casing 20 so that the peripheral portion 31 of the fastening element 30 surrounds the tubular casing 20 at a distance at least in portions so that the coating passage 17 can be formed.

The peripheral portion 31 further includes a breakthrough 40 formed from the outer surface 34 toward the inner surface 33. The breakthrough 40 is formed especially between the four connecting points 11. In the shown example, the breakthrough 40 delimits a cross-sectional surface which is substantially rectangular, the cross-sectional surface amounting to at least 70% of the surface of the entire peripheral portion 31. The shape of the breakthrough 40 may also be referred to as bell-shaped or mushroom-shaped. When the subassembly 10 is coated, anti-corrosive material may get through the breakthrough 40 from outside, i.e. from the outer surface 34 to the inner surface 33 of the peripheral portion 31. Furthermore, the surface portion 22 of the casing 20 can also be provided with an anti-corrosion layer. Prior to coating the tubular casing 20 and/or the fastening element 30, the peripheral portion 31 is connected to the casing 20 at the four connecting points 11 by means of spot welding. The connecting points 11 are weld spots as already described. During coating, especially during galvanic coating or spray-coating, also the connecting points 11 are provided with an anti-corrosion layer.

The fastening element 30 includes a first fastening flange 12 as well as a second fastening flange 12'. The first fastening flange 12 is smaller than the second fastening flange 12' related to its surface area. Both the first fastening flange 12 and the second fastening flange 12' are substantially flat plate-shaped elements. The first fastening flange 12 includes the fastening hole 13. The larger second fastening flange 12', on the other hand, includes a fastening hole 13' as well as a fastening slot 14. With the aid of the fastening flanges 12 and 12' the fastening element 30 can be connected to the vehicle body so that the casing 20 welded to the fastening element 30 is indirectly connected to the vehicle body via the fastening element 30.

A curved transitional portion 15 is formed between the first fastening flange 12 and the peripheral portion 31. Also between the second fastening flange 12' and the peripheral portion 31 of the fastening element 30 a transitional portion 15' is formed. The transitional portions 15 and 15' are curved against the curvature of the peripheral portion 31 so that the fastening flanges 12 and 12' project perpendicularly or tangentially from the casing 20. The extension planes E1 and E2 of the fastening flanges 12 and 12' extend substantially in parallel to each other.

Beads 16, 16' are formed in the transitional portion 15' between the peripheral portion 31 and the second fastening flange 12'. The beads 16 and 16' serve for reinforcing the transitional portion 15'. The bead 16' protrudes from the transitional portion 15' into the fastening flange 12'. The beads 16 are formed merely in the transitional portion 15'. The stiffening of the transitional portion 15' as well as partially of the fastening flange 12' causes the casing 20 to be connected in a tight and, resp., as stable manner as possible to the vehicle body by means of the fastening element 30. The fastening element 30 is minimized in terms of weight due to the large-area breakthrough 40.

The illustrated tubular casing 20 may be an inflator casing or an external actuator casing. If it is an external actuator casing, the subassembly 10 is part of a hood stay. If the tubular casing 20 is an inflator, the subassembly 10 is formed as part of an airbag module.

The details shown in FIG. 1, for example regarding the fastening flanges 12 and 12', the extension planes E1 and E2 thereof as well as the transitional portions 15 and 15' and the beads 16 and 16', are also applicable in connection with the embodiments according to FIGS. 2 to 6. Hereinafter the differently designed breakthroughs shall be discussed. Irrespective of the shape of the breakthroughs, it is applicable that they serve especially for coating the casing 20 and the connecting points 11 and the inner surface 33 of the peripheral portions 31 of the fastening elements 30. Hereinafter it is also applicable that the inner surface 33 is formed to be spaced apart from the surface portion 22 of the casing 20. The casing 20 contacts the fastening element 30 merely in the area of the connecting points 11.

Figure 2:
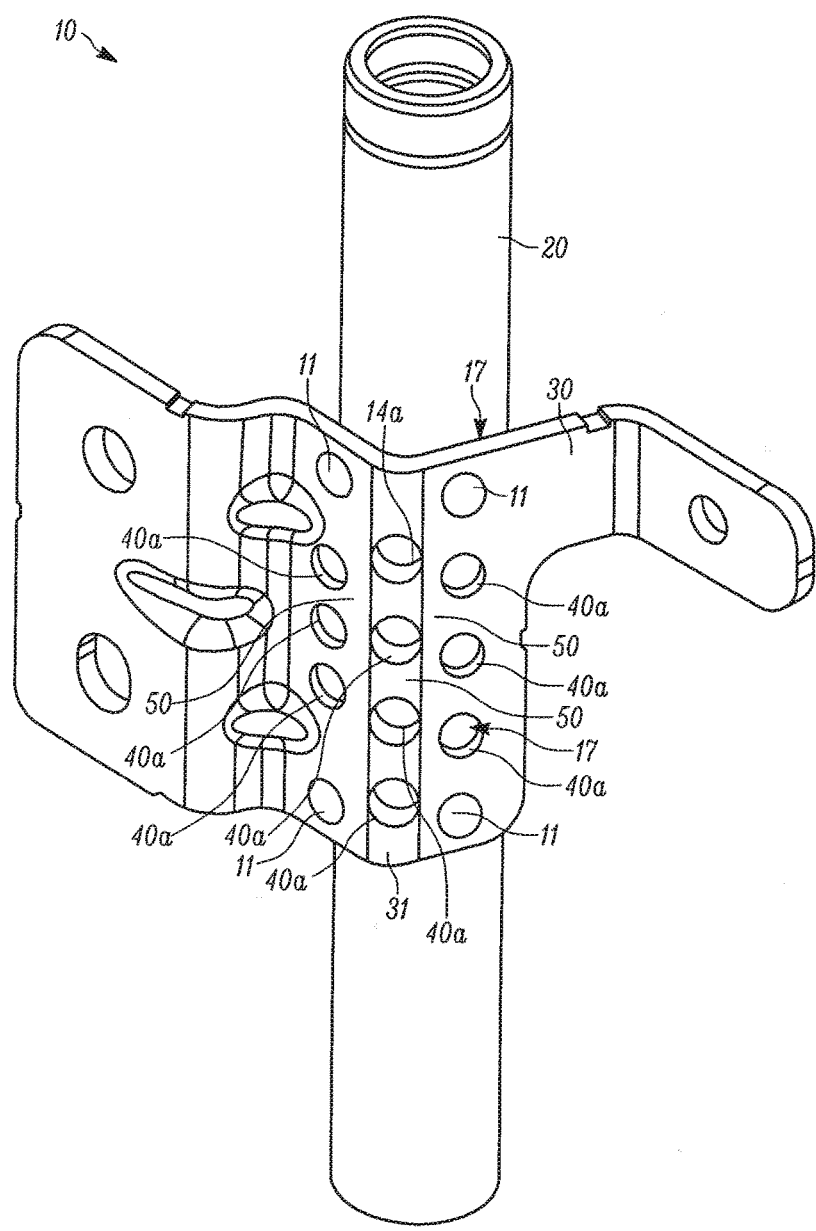

In FIG. 2 plural breakthroughs 40a are shown. The ten breakthroughs 40a are in the form of holes, especially of circular holes. The breakthroughs 40a in the form of holes are configured especially in the area between the four connecting points 11 designed as weld spots. Lands 50 are formed between the breakthroughs 40a. The stiffness in the area of the connecting points or weld spots 11 is reduced by virtue of the lands 50 formed. In this way the fastening element 30 may deform more easily when being connected to, especially welded to, the casing 20. Thus the residual stresses in the connecting points 11 are reduced following the connecting operation. These advantages are also valid in connection with the embodiments shown in FIGS. 3 to 6 in which lands are equally formed.

Figure 3:
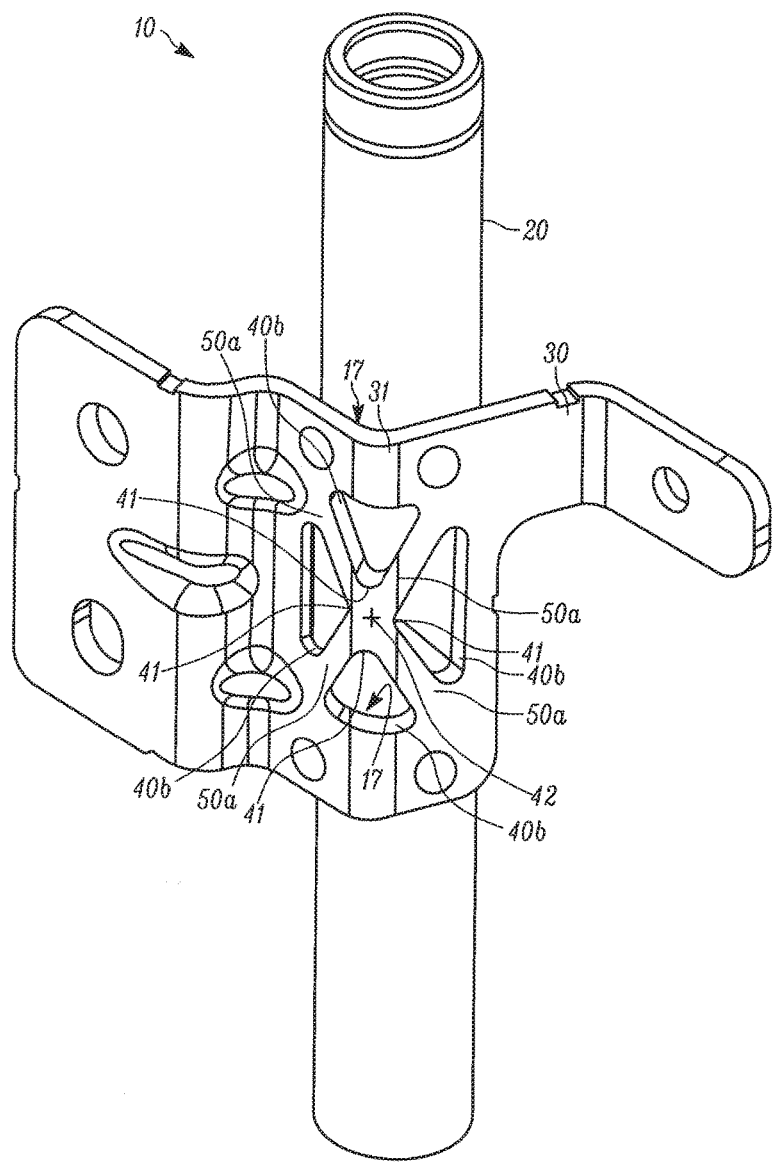

In the embodiment according to FIG. 3 four breakthroughs 40b are formed in the peripheral portion 31 of the fastening element 30. The breakthroughs 40b have a cross-sectional surface in the form of isosceles triangles. The breakthroughs 40b are arranged so that the points 41 of the triangular cross-sectional surfaces are facing each other. The points 41 converge in a central spot 42. The points 41 of the breakthroughs 40b are meant to be the locations of the triangles in which the respective equal legs coincide. Due to the arrangement of the four breakthroughs 40b four lands 50a are formed. Said lands 50a space the breakthroughs 40b from each other. The four breakthroughs 40b in total delimit a cross-sectional surface and, resp., a total cross-sectional surface which in the shown example amounts to at least 50% of the overall surface of the peripheral portion 31. This results in considerable weight saving.

Figure 4:
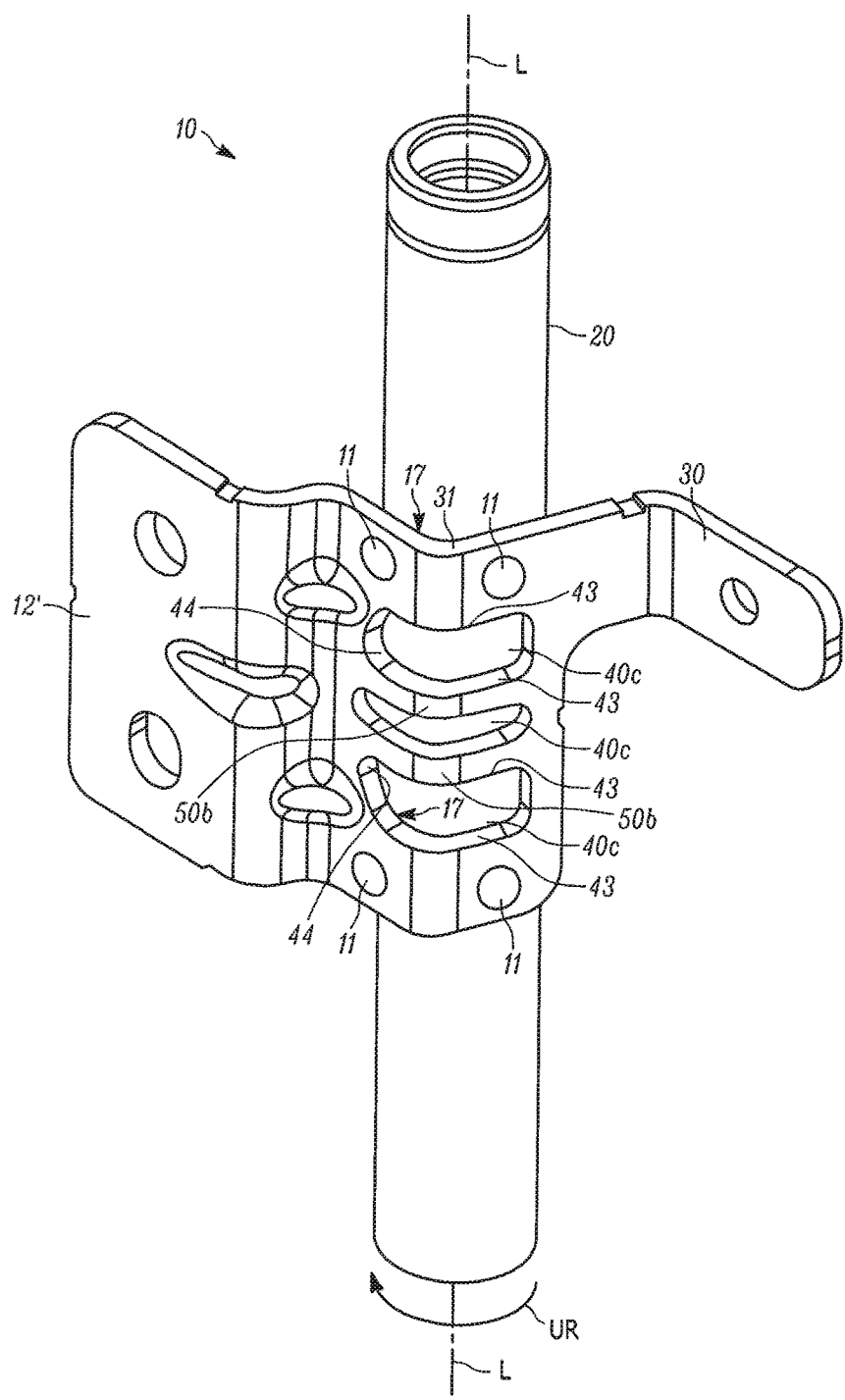

In FIG. 4 three breakthroughs 40c are configured each of which has a rectangular cross-sectional surface. The lengths 43 of the rectangular cross-sectional surfaces point in the radial circumferential direction UR of the casing 20. The lengths 43 are formed to be parallel to each other. The lengths 43 are meant to be the two respective longest sides of the rectangular breakthroughs 40c. Each of the upper breakthrough 40c and the lower breakthrough 40c includes an extended corner area 44 pointing in the direction of the second fastening flange 12'. The upper breakthrough 40c and the lower breakthrough 40c are axially symmetric relative to the central breakthrough 40c. The three breakthroughs 40c in total delimit a cross-sectional surface relating to at least 60% of the total surface of the peripheral portion 31. The breakthroughs 40c are formed substantially between the four connecting points 11. The specific design of the extended corner area 44 brings about a stiffened embodiment of the transitional portion 15'. Rectilinear lands 50b are formed between the breakthroughs 40c.

Figure 5:
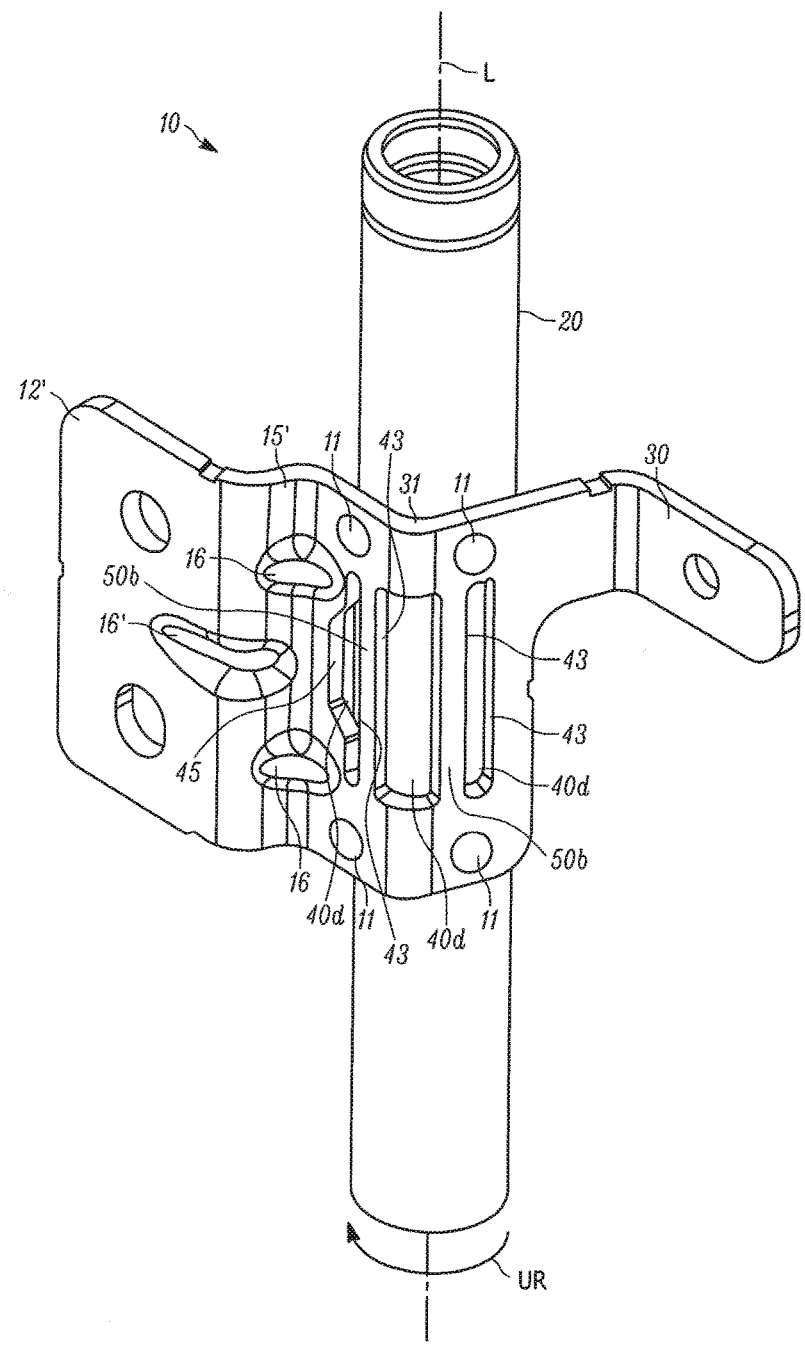

In the embodiment according to FIG. 5 three breakthroughs 40d substantially including rectangular cross-sectional surfaces are configured. The lengths 43 of the rectangular cross-sectional surfaces are configured to point in the longitudinal direction L of the casing 20. The central breakthrough 40d includes a larger cross-sectional surface than the breakthrough 40d shown on the right. The left-hand breakthrough 40d includes an additional recess 45 configured to point in the direction of the second fastening flange 12' or, resp., in the direction of the transitional flange 15'. Along with the beads 16, 16' a fastening element 30 is formed which, on the one hand, is reduced as to weight and, on the other hand, causes low residual stresses in the connection points 11 after connecting the fastening element 30 to the casing 20. In addition, strong and extremely stable fastening of the fastening element 30 to the vehicle body (not shown) is enabled. Lands 50b which equally extend rectilinearly are formed between the breakthroughs 40d.

Figure 6:
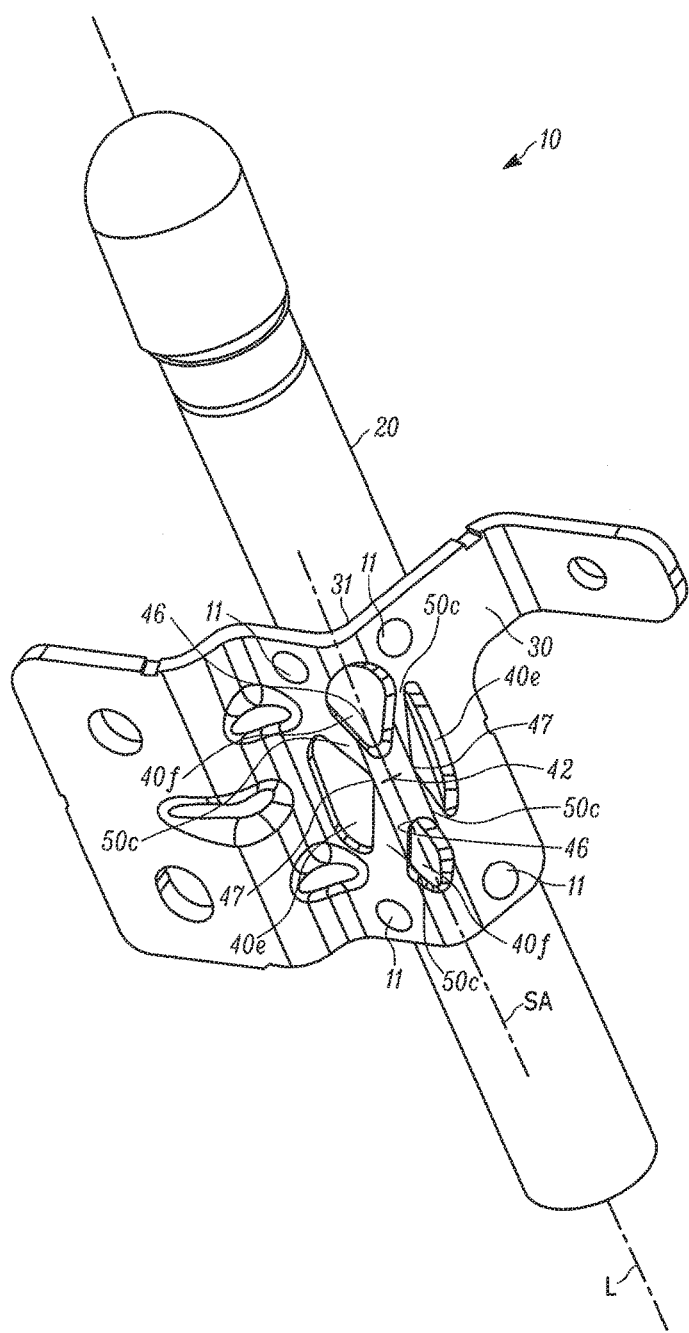

In the embodiment of the fastening element 30 according to FIG. 6 four breakthroughs are formed, wherein each of two first breakthroughs 40e have a cross-sectional surface in the form of a pentagon and each of two second breakthroughs 40f has a cross-sectional surface in the form of a rectangle. The two first breakthroughs 40e and the two second breakthroughs 40f are configured to oppose each other. By virtue of this arrangement of the breakthroughs, lands 50c are formed which converge in a central point 42. Also one point 46 of each of the two breakthroughs 40e and one point 47 of each of the breakthroughs 40f are facing said central spot 42.

The two second breakthroughs 40f are arranged to be reflected relative to a mirror axis SA extending through the central spot 42 in the longitudinal direction of the casing L. The axis of reflection SA extending through the central spot 42 extends through each of the two breakthroughs 40e. The breakthroughs 40e are formed by reflecting a triangular cross-section by the mirror axis SA.

LIST OF REFERENCE NUMERALS

10 Subassembly
11 connecting point
12, 12' fastening flange
13, 13' fastening hole
14 fastening slot
15, 15' transitional portion
16, 16' bead
17 coating passage
20 casing
21 surface
22 surface portion of casing
30 fastening element
31 peripheral portion
32 surface
33 inner surface of peripheral portion
34 outer surface of peripheral portion
40, 40a, 40b, 40c, 40d, 40e, 40f breakthrough
41 point
42 central spot
43 length
44 corner area
45 recess
46 point
47 point
50, 50a, 50b, 50c land
E1, E2 extension plane of fastening flange
L longitudinal direction of casing
SA axis of reflection
UR radial circumferential direction

The invention claimed is:

1. A subassembly (10) of a vehicle safety system comprising:
    a tubular casing (20); and
    a fastening element (30) that includes at least one fastening hole (13) and a peripheral portion (31) curved at least in portions, the fastening element (30) further including first and second fastening flanges (12, 12') positioned on opposite sides of the casing (20), each of the first and second fastening flanges (12, 12') including at least one fastening hole (13, 13') for receiving a fastening member to secure the fastening element (30) to a vehicle body,
    wherein the peripheral portion (31) is connected at least at one connecting point (11) to the tubular casing (20) such that the tubular casing (20) engages the fastening element (30) only at the at least one connecting point (11) with no portion of the fastening element (30) extending entirely around the tubular casing (20), wherein the peripheral portion (31) includes at least one breakthrough (40) and that between the peripheral portion (31) and the casing (20) a coating passage (17) is formed at least in portions, wherein at least one of the tubular casing (20) and the fastening element (30) includes an anti-corrosion layer at least in portions on its exposed surface (21, 32).

2. The subassembly (10) according to claim 1, wherein the peripheral portion (31) is curved in the radial circumferential direction (UR) of the casing (20) so that the peripheral portion (31) surrounds the casing (20) at a distance at least in portions so as to form the coating passage (17).

3. The subassembly (10) according to claim 1, wherein at least one connecting point (11) is a weld spot or a weld seam.

4. The subassembly (10) according to claim 1, wherein the peripheral portion (31) includes an inner surface (33) facing the casing (20) and an outer surface (34) facing away from the casing (20), wherein the at least one breakthrough (40) is formed in the peripheral portion (31) from the outer surface (34) to the inner surface (33) and wherein the at least one breakthrough (40) is not configured as a fastening hole for fastening the subassembly (10) to a component fixed to the vehicle.

5. The subassembly (10) according to claim 4, wherein the thickness of the coating passage (17) extending in the longitudinal direction (L) of the casing (20), measured as distance between the inner surface (33) of the peripheral portion (31) and a surface portion (22) of the casing (20) facing the peripheral portion (31), amounts to 0.5-2.0 mm.

6. The subassembly (10) according to claim 1, wherein the at least one breakthrough (40) includes a cross-sectional surface the size of which amounts to at least 30% of the surface of the peripheral portion (31).

7. The subassembly (10) according to claim 1, wherein the fastening element (30) comprises transitional portions (15, 15') configured between each fastening flange (12, 12') and the peripheral portion (31).

8. The subassembly (10) according to claim 7, wherein the second fastening flange (12') includes a fastening slot (14), wherein planes of extension (E; E1) of the fastening flanges (12, 12') extend substantially in parallel to each other.

9. A vehicle safety system comprising a subassembly (10) according to claim 1.

10. A vehicle safety device for protecting a pedestrian or for protecting a vehicle occupant comprising a vehicle safety system including a subassembly (10) according to claim 1, and further comprising an electronic control unit by means of which the vehicle safety system can be activated upon occurrence of a release situation.

11. The subassembly (10) according to claim 1, wherein the anti-corrosion layer is on the entire exposed surface (21, 32) of at least one of the tubular casing (20) and the fastening element (30).

12. The subassembly (10) according to claim 1, wherein the tubular casing (20) is an inflator or an outer actuator casing.

13. The subassembly (10) according to claim 1, wherein the at least one breakthrough (40) comprises plural breakthroughs (40c, 40d) each of which includes a substantially rectangular cross-sectional surface, wherein the lengths (43) of all rectangular cross-sectional surfaces point in the radial circumferential direction (UR) of the casing (20) or in the longitudinal direction (L) of the casing (20).

14. The subassembly (10) according to claim 1, wherein the at least one breakthrough (40) comprises two first breakthroughs (40e) that include a cross-sectional surface substantially in the form of a pentagon and two second breakthroughs (40f) that include a cross-sectional surface substantially in the form of a rectangle, the two first breakthroughs (40e) and the two second breakthroughs (40f) extending within planes that face each other.

15. A vehicle safety system comprising at least one of hood stays and an inflator for an airbag module, and further comprising a subassembly (10) according to claim 1.

16. The subassembly according to claim 1, wherein the at least one connecting point comprises a plurality of discrete, spaced apart weld spots between the casing and the fastening element.

17. The subassembly (10) according to claim 1, wherein the at least one connecting point comprises multiple connecting points with every connecting point on the fastening element being positioned on a single side of the casing.

18. A method of manufacturing a subassembly (10) of a vehicle safety system comprising a tubular casing (20) and a fastening element (30) which includes at least one fastening hole (13, 13') and a peripheral portion (31) curved at least in portions, comprising the steps of:
   forming at least one breakthrough (40) in the peripheral portion (31) of the fastening element (30),
   connecting the peripheral portion (31) to the tubular casing (20) at least at one connecting point (11) so that a coating passage (17) is configured at least in portions between the peripheral portion (31) and the tubular casing (20) and such that the tubular casing (20) engages the fastening element (30) only at the at least one connecting point (11) with no portion of the fastening element (20) extending entirely around the tubular casing (20), with first and second fastening flanges (12, 12") of the fastening element (30) being positioned on opposite sides of the casing (20), each of the first and second fastening flanges (12, 12') including the at least one fastening hole (13, 13') for receiving a fastening member to secure the fastening element (30) to a vehicle body,
   coating at least a portion of the exposed surface (21; 32) of the tubular casing (20) and/or the fastening element (30) with an anti-corrosion layer,
   wherein the peripheral portion (31) is welded and/or bonded at least at one connecting point (11) to the tubular casing (20), and wherein the anti-corrosion layer of the tubular casing (20) and/or of the fastening element (30) is applied by galvanic coating and/or spray-coating and/or painting.

19. The method of claim 18 further comprising applying the anti-corrosion layer through the at least one breakthrough to coat portions of at least one of the exposed surfaces encircling the at least one connecting point.

20. The method according to claim 18, wherein the step of connecting the fastening portion to the tubular casing comprises welding the peripheral portion to the tubular casing at a plurality of connecting points such that the fastening portion only engages the tubular casing at the connecting points.

21. The method of claim 18, wherein the at least one connecting point comprises multiple connecting points with every connecting point on the fastening element being positioned on a single side of the casing.

22. A subassembly of a vehicle safety system comprising:
   a tubular casing; and
   a fastening element that includes at least one fastening hole and a curved peripheral portion including a plurality of breakthroughs in the form of one of circular and triangular holes,
   the peripheral portion being secured to the tubular casing by at least one connecting point such that the fastening element only engages the tubular casing at the at least one connecting point and is otherwise radially spaced from the tubular casing by a coating passage with no portion of the fastening element extending entirely around the tubular casing, wherein an exposed surface of at least one of the tubular casing and the fastening element is covered with an anti-corrosion layer.

23. The subassembly (10) according to claim 22, wherein the triangular breakthroughs (40b) have triangular cross-sectional surfaces arranged so that the points (41) of the triangular cross-sectional surfaces are facing toward each other and lands (50a) are formed between the breakthroughs.

24. The subassembly according to claim 22, wherein the at least one connecting point comprises a plurality of discrete, spaced apart weld spots between the casing and the fastening element.

25. The subassembly according to claim 22, wherein the fastening element includes first and second flanges positioned on opposite sides of the casing, each of the first and second flanges including at least one fastening hole for receiving a fastening member to secure the fastening element to a vehicle body.

26. The subassembly according to claim 22, wherein the at least one connecting point comprises multiple connecting points with every connecting point on the fastening element being positioned on a single side of the casing.

* * * * *